Figure 3:
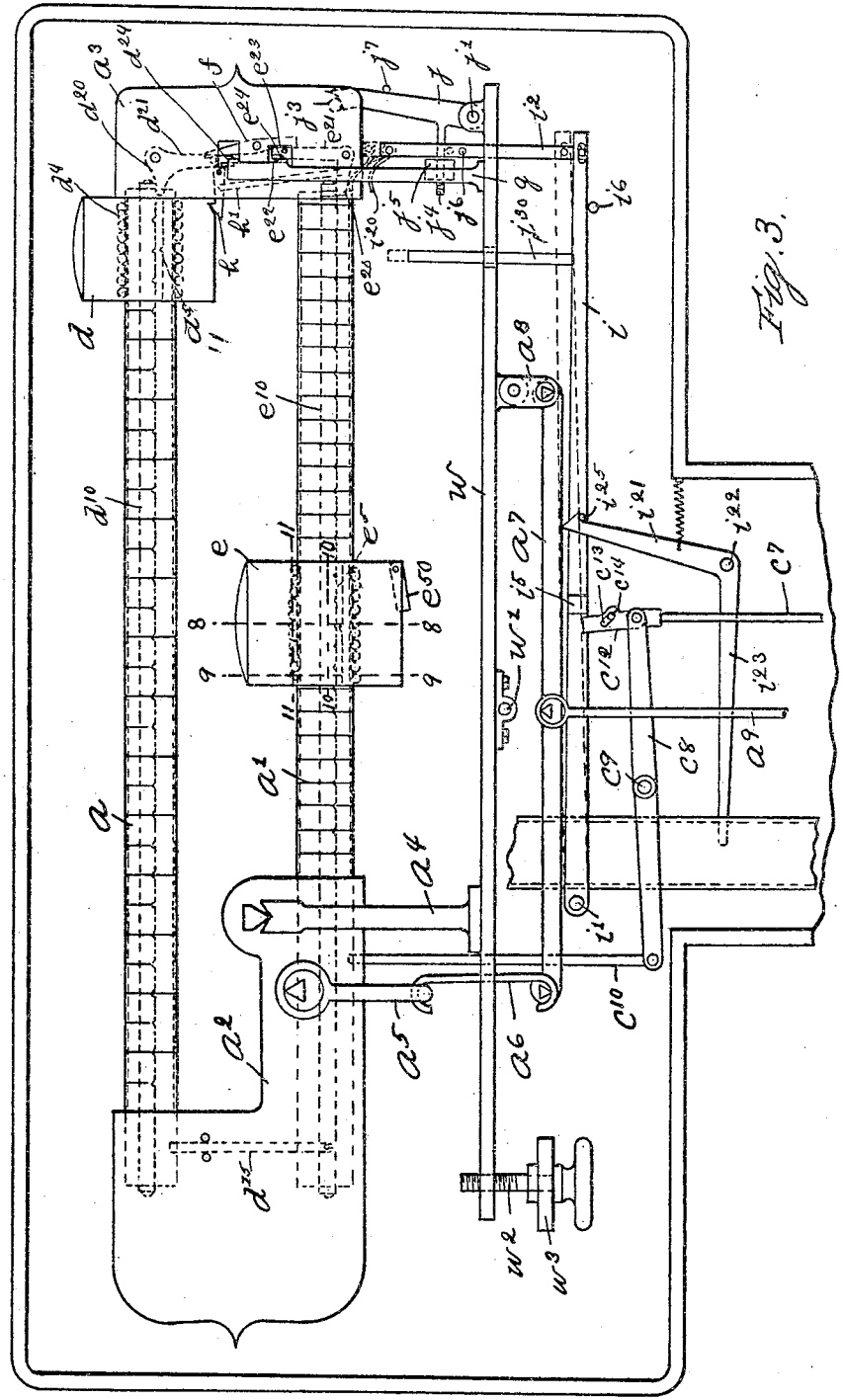

C. J. McLEOD.
WEIGHING MACHINE.
APPLICATION FILED JAN. 22, 1906.
930,875.
Patented Aug. 10, 1909.
4 SHEETS—SHEET 1.
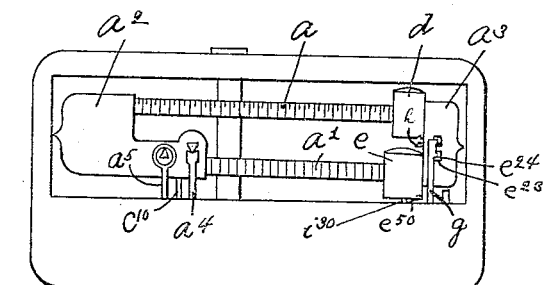
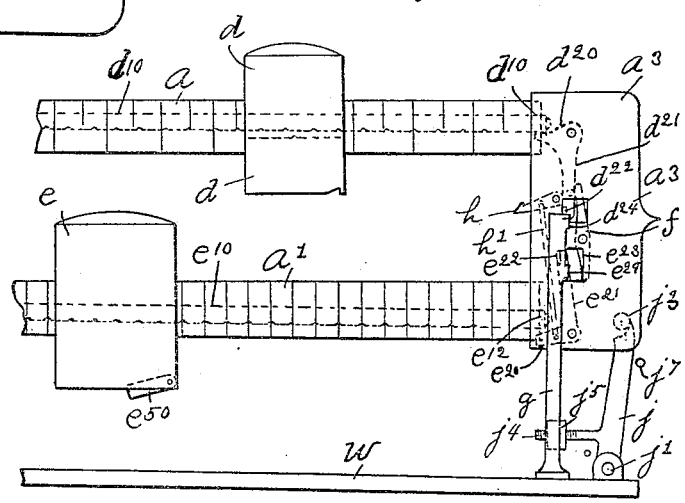
Fig. 4.
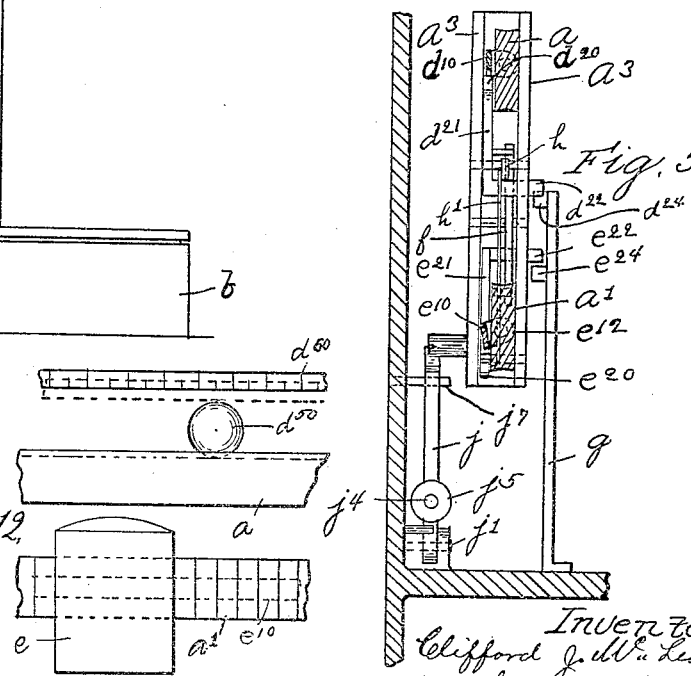
Fig. 1.
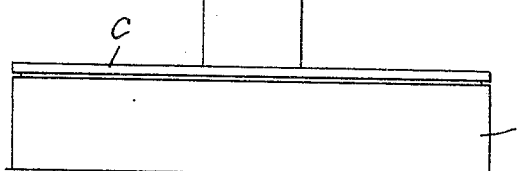
Fig. 12.
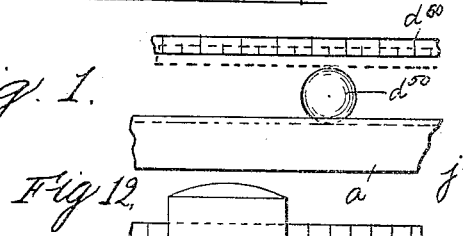
Fig. 5.
Witnesses:
H. B. Davis.
Cynthia Doyle.
Inventor:
Clifford J. McLeod
by Hayes & Harriman
Attys.

C. J. McLEOD.
WEIGHING MACHINE.
APPLICATION FILED JAN. 22, 1906.
930,875.
Patented Aug. 10, 1909.
4 SHEETS—SHEET 2.
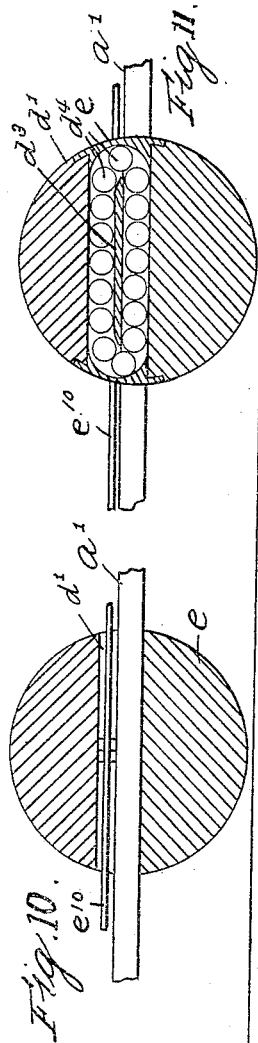
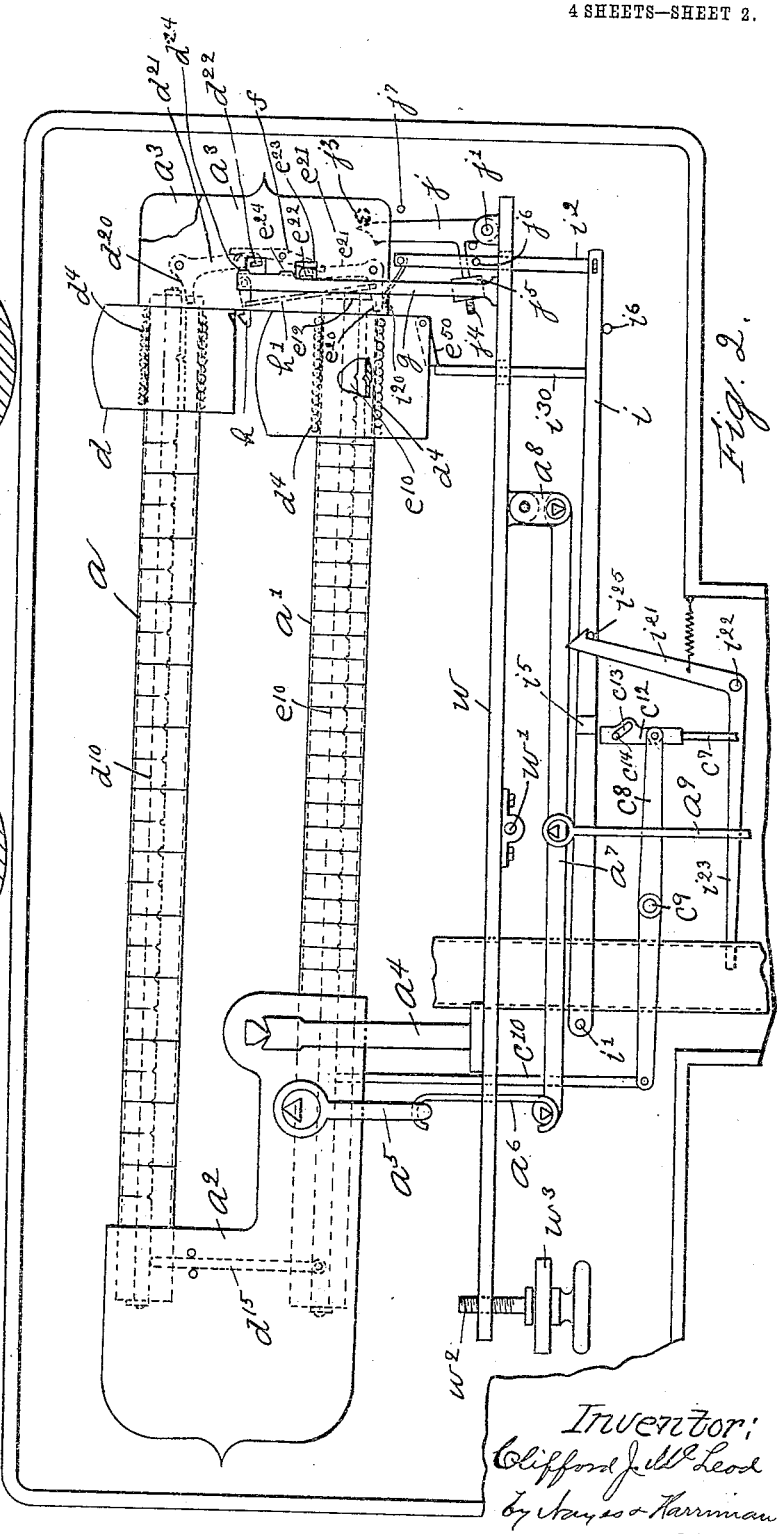
Witnesses:
H. B. Davis.
Cynthia Doyle.
Inventor:
Clifford J. McLeod
by Hayes & Harriman
attys.

C. J. McLEOD.
WEIGHING MACHINE.
APPLICATION FILED JAN. 22, 1906.

930,875.

Patented Aug. 10, 1909.
4 SHEETS—SHEET 3.

Witnesses:
H. B. Davis.
Cynthia Doyle

Inventor:
Clifford J. McLeod
by Noyes & Harriman
Attys

C. J. McLEOD.
WEIGHING MACHINE.
APPLICATION FILED JAN. 22, 1906.
930,875.
Patented Aug. 10, 1909.
4 SHEETS—SHEET 4.
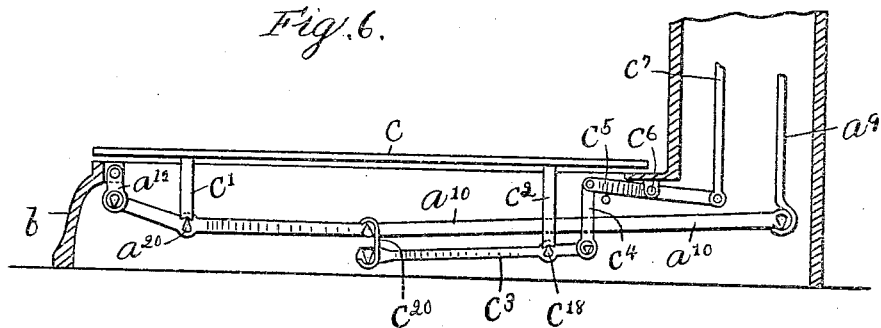
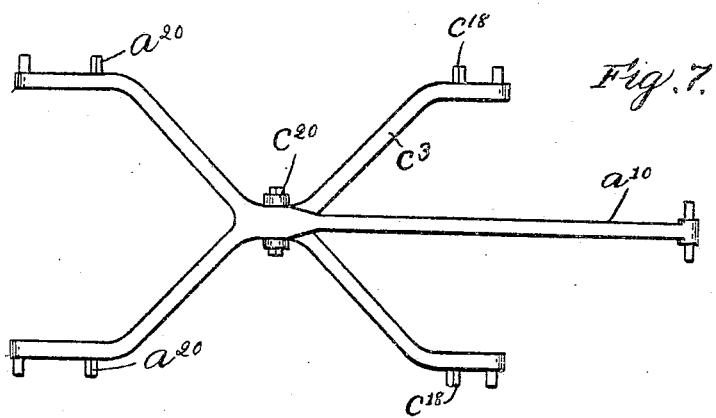
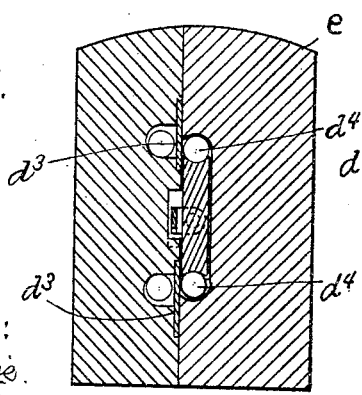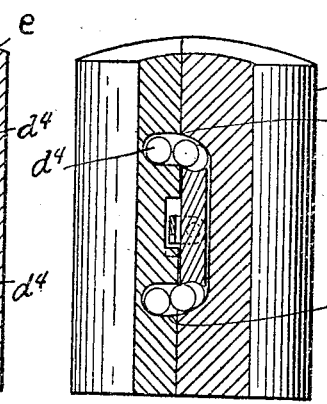
Witnesses:
H. B. Davis.
Cynthia Doyle
Inventor:
Clifford J. McLeod
by Noyes & Harrison
attys

UNITED STATES PATENT OFFICE.

CLIFFORD J. McLEOD, OF HYDE PARK, MASSACHUSETTS, ASSIGNOR, BY MESNE ASSIGNMENTS, TO AUTOMATIC BEAM SCALE COMPANY, A CORPORATION OF MAINE.

WEIGHING-MACHINE.

No. 930,875.   Specification of Letters Patent.   Patented Aug. 10, 1909.

Application filed January 22, 1906.   Serial No. 297,098.

*To all whom it may concern:*

Be it known that I, CLIFFORD J. McLEOD, of Hyde Park, county of Norfolk, State of Massachusetts, have invented an Improvement in Weighing-Machines, of which the following description, in connection with the accompanying drawings, is a specification, like characters on the drawings representing like parts.

This invention relates to weighing machines of the platform variety, having a pivoted scale-beam with one or more counterpoises thereon, and has for its object to provide for the operation and control of one or more counterpoises, which are adapted to move along on the scale-beam to indicate the weight; also to provide means, preferably operated by the platform, for moving the scale-beam, which normally declines toward one end, as for instance toward its outer end, to cause it to decline toward its opposite end, as for instance toward its inner end, to thereby present declining scale-beam bars on which the counterpoises are free to slide by gravity; also to provide means for moving the scale-beam into an elevated position, and means, as a prop, for holding the scale-beam in such elevated position, while the counterpoises move along thereof to indicate the weight; also to provide means preferably operated by the platform, for moving the prop into position to engage the elevated scale-beam; also to provide means for locking, at least one of the counterpoises, if two are employed, at the outer end of the scale-beam; also to provide means for releasing the counterpoise, which is thus locked at the outer end of the scale-beam, after said scale-beam has been lifted, thereby permitting it to move along on the declining scale-beam by gravity to indicate the weight; also to provide means for locking said counterpoise in intermediate position on the scale-beam bar it will occupy when indicating the weight; also to provide a controlling device for controlling the operation of the locking device which is employed for locking the counterpoise at intermediate positions on the scale-beam bar, said controlling-device operating to hold the locking-device disengaged from the counterpoise, while said counterpoise is moving along on the scale-beam bar to indicate the weight, and to subsequently permit it to operate and engage the counterpoise; also to provide means for locking the other counterpoise at the outer end of the scale-beam before or as soon as the first counterpoise is first released, to thereby hold it at rest while the first counterpoise is moving along on its scale-beam bar to indicate the weight; also to provide means for releasing the second counterpoise after or as soon as the first counterpoise, which has moved along on its scale-beam bar to indicate the weight, has become locked; also to provide means for locking the second counterpoise at the intermediate point on the scale-beam bar it will occupy when indicating the weight; also to provide a controlling device for controlling the operation of the locking device of said second counterpoise, which is employed for locking it at the intermediate positions on the scale-beam bar it will occupy when indicating the weight, said controlling device operating to hold the locking device disengaged from the counterpoise while the counterpoise is moving along on the scale-beam bar to indicate the weight and to subsequently permit it to operate and engage the counterpoise; also to provide the prop, which holds the scale-beam in elevated position, with means for operating it, whereby the position of the scale-beam may be controlled in such manner as to govern the action of the controlling-devices employed for controlling the operation of the locking-devices which are employed for locking the counterpoises at intermediate positions on the scale-beam; also to provide means, preferably operated by the platform, for releasing both counterpoises in any positions they may occupy on the scale-beam bars when indicating the weight, permitting them to return to their normal positions at the outer end of the scale-beam bars.

Figure 1 shows in front elevation a weighing machine embodying this invention. Fig. 2 shows in front elevation the upper part of the weighing machine shown in Fig. 1, taken on an enlarged scale, showing particularly the graduated scale-beam and controlling devices for the counterpoises which are mounted thereon, the parts being respectively in their normal positions of rest. Fig. 3 is a similar view showing the scale-beam lifted and one of the counterpoises released. Fig. 4 is a detail of a portion of the scale-beam and controlling devices for the counterpoises, the beam being in elevated position, and both counterpoises released. Fig. 5 is an end view of the scale-beam and controlling device therefor. Fig. 6 is a longitudinal section of the base of the machine, showing particularly the balancing levers therein. Fig. 7 is a detail showing in plan view the balancing levers shown in Fig. 6. Figs. 8 and 9 are vertical sections of one of the counterpoises taken respectively on the dotted lines 8—8 and 9—9, Fig. 3. Figs. 10 and 11 are transverse sections of one of the counterpoises taken respectively on the dotted lines 10—10 and 11—11, Fig. 3. Fig. 12 is a detail showing a modified form of counterpoise.

The scale-beam herein shown provides for the employment of two counterpoises and comprises two graduated bars $a$, $a'$, disposed in parallelism or approximately in parallelism, and connected together at one end by the counterbalancing plate $a^2$, and at the opposite end by a pair of parallel plates $a^3$, $a^3$. If, however, only one counterpoise is employed only one bar will be required. The bar $a$, herein shown, has one pound graduations and fractions thereof, and the bar $a'$, herein shown, has ten pound graduations; and each bar has mounted upon it a counterpoise which is adapted to move thereon, from end to end thereof, $d$ and $e$ representing the two counterpoises. The scale-beam is supported upon an upright pivot post $a^4$, which is erected upon and stationarily supported by a frame-plate $w$. The scale-beam normally declines toward one end, as for instance toward its outer end, and the counterpoises normally occupy positions at the extreme outer ends of the scale-beam bars, and said scale-beam is adapted to be moved on its pivot so as to decline toward its opposite or inner end in order that the counterpoises may move along on the scale-beam bars by their own weight. In order that the automatically operated counterpoises may move along on the scale-beam bars with as little friction as possible, they may be provided with ball or roller bearings. The counterpoises are herein represented as cylindrical or other shaped blocks, having transverse holes through them for the scale-beam bars $a$, $a'$. Each scale-beam bar has its upper and under side or edge formed with a groove adapted to receive the balls which are contained in suitable chambers in the counterpoises, and each counterpoise has two oblong ball-receiving chambers formed within it; adjacent the bar on which it is mounted, said chambers being represented at $d'$, $d^2$, Fig. 9 and each ball-receiving chamber has a partition wall $d^3$ extending lengthwise thereof and nearly from end to end thereof, see Figs. 8 and 11 to thereby provide an endless runway or passage for an endless series or group of balls $d^4$. The balls of each endless series or group are arranged in two parallel rows at opposite sides of the partition wall, and also around the ends of said wall, and travel in the runway provided for them around the partition wall in one or the other direction according to the direction of movement of the counterpoise.

The ball-receiving chambers are so located with respect to the grooves in the upper and under sides of the bar that the balls at one side of each partition wall will enter and run in the grooves, passing out of the grooves at one end as they enter the grooves at the opposite end of the partition walls, the entire series or group of balls in each chamber thus continually moving as the counterpoise moves along. As the scale-beam declines in one or the other direction the counterpoises will move freely on the scale-beam bars by gravity until arrested at a point intermediate the length of said bars, or until they arrive at the extreme ends of said bars. The counter-balancing plate $a^2$ of the scale-beam is connected by links $a^5$, $a^6$, with one end of a lever $a^7$, which is pivotally connected at its opposite end to a short link $a^8$, depending from and pivotally connected to the frame-plate $w$. The lever $a^7$ is connected, at a point intermediate its length, by a rod $a^9$, with one end of a balancing lever $a^{10}$, which is horizontally disposed in the stationary base of the machine. The lever $a^{10}$ is forked at one end and the extremities of the two arms of the forked end of said lever are pivotally connected by short links $a^{12}$ to the base, said lever being thereby pivotally supported. The platform $c$, of usual construction, has two legs $c'$, which extend downward and engage lugs $a^{20}$ projecting laterally from the arms of the forked end of the lever $a^{10}$ at points near the ends thereof, and also has two legs $c^2$, which extend downward and engage lugs $c^{18}$ projecting laterally from the arms of a forked lever $c^3$, at points near the ends thereof. The forked lever $c^3$ is also horizontally disposed in the base, and is loosely connected at one end by a short link $c^{20}$ with the lever $a^{10}$, and the outer ends of its arms are connected by links $c^4$ with the outer ends of the arms of a forked lever $c^5$ which is pivoted at $c^6$ to the base. The opposite end of said lever $c^5$ is connected to the lower end of a rod $c^7$ which extends upward, through the upright column of the machine, and is connected at its upper end to one end of a lever $c^8$, pivoted at $c^9$ to the frame, the opposite end of said lever having loosely attached to it an upright post $c^{10}$, for purposes to be hereinafter described. The rod $c^7$ has also pivoted to it, at its upper end, a plate $c^{12}$, which is formed or provided with a diagonal slot $c^{13}$, which receives a fixed pin $c^{14}$ on the frame, said pin causing the plate $c^{12}$ to move back and forth on its pivot as the rod $c^7$ is moved up and down.

A lever $i$ is pivoted at one end to the frame, as at $i'$, and has a lug $i^5$ extending outwardly from it at a point intermediate its length, which normally rests by gravity upon the upper edge or top of the plate $c^{12}$. As the plate $c^{12}$ is raised by the rod $c^7$ it will act to lift the lever $i$ on its pivot, but, as said plate is turned on its pivot by the pin $c^{14}$, while rising, it will soon pass from beneath the lug $i^5$, and as soon as said lug is thus disengaged the lever $i$ will be free to fall by gravity, until it resumes its normal position against the fixed stop $i^6$. When the rod $c^7$ descends or returns to its normal position the pivoted plate $c^{12}$ will be returned to the position beneath the lug $i^5$ so as to engage said lug preparatory to again lifting the lever $i$ when the rod $c^7$ is again raised. The lever $i$ serves as and constitutes the main actuating lever which is employed for lifting the scale-beam and for performing other functions, as will be described, and is herein shown as coin-controlled, as for instance, it may have extended laterally from it a pin $i^{25}$, which is engaged by one arm $i^{21}$ of a bell-crank lever, which is pivoted at $i^{22}$, the other arm $i^{23}$ of said lever being so disposed with respect to a coin-receiving tube as to be engaged by a coin sliding down said tube. The weight of the coin acts to depress the arm $i^{23}$ and remove the arm $i^{21}$ from engagement with the pin $i^{25}$, and to thereby release the actuating lever $i$. As the scale-beam normally declines toward its outer end, and the automatically operated counterpoises $d, e$, normally occupy positions at the outer ends of the scale-beam bars, to cause said counterpoises to slide along on said scale-beam bars by gravity, toward their inner ends, to indicate the correct weight, the scale-beam must be lifted so as to decline toward its inner end. To thus lift the scale-beam, an upright post $i^{30}$ is provided on the actuating lever $i$, which, as herein shown, occupies a position beneath the counterpoise $e$, which is mounted on the lowermost scale-beam bar $a'$, and when said lever $i$ is raised the counterpoise $e$ will be engaged by said post $i^{30}$, and will be lifted, carrying the scale-beam and attached parts with it. Thus, a weight upon the platform $c$ acts through the balancing levers and rod $a^6$ to exert a downward pulling force upon the counterbalancing plate $a^2$, tending to lift the scale-beam on its pivot, as usual in platform scales, although such action is opposed by the counterpoises on the scale-beam; and also acts to raise the rod $c^7$ and lift the actuating lever $i$ to move the scale-beam into elevated position, or lift the scale-beam and cause it to decline toward its inner end; and also acts to disengage said actuating lever $i$ from the scale-beam, in order that said actuating lever may resume its normal position.

To hold the scale-beam in its elevated position, i. e., declining toward its inner end, when the actuating lever disengages it and resumes its normal position, in order that the counterpoises may slide along on the scale-beam bars to indicate the weight, or while the counterpoises are thus operating, a prop is provided, which is located at or near the outer end of the scale-beam, and which, as herein shown, consists of an upright post $j$, pivoted at its lower end, at $j'$, to the frame-plate $w$, and having its upper end curved, as shown, and said curved end is adapted to engage a stud $j^2$, on the scale-beam, which may be located between the plates $a^3, a^3$, thereof and said prop has an arm $j^4$ extended from it, near its lower end, which is screw-threaded and receives upon it a weight $j^5$, which is adjustable thereon, the tendency of which is to move the prop $j$ in a direction toward the left. The prop is moved toward the right and its weighted arm lifted by the actuating lever $i$, which is provided with an upright post $i^2$ at its extremity, having thereon a laterally extended pin $j^6$, at a point intermediate its length, which is adapted to engage the weighted arm $j^4$ of the prop when said actuating lever is lifted. The prop will be moved by said actuating lever in a direction toward the right until it strikes a pin $j^7$ or other fixed stop. The prop $j$ normally occupies a position at the left hand side of the stud $j^2$, being slightly removed therefrom, as shown in Fig. 2, but when the actuating lever $i$ is operated to move the scale-beam into an elevated position, said prop will be moved toward the right and caused to pass beneath said stud to a position whereby the stud will bear upon the left hand end of its curved extremity, as shown in Fig. 3. The prop $j$, having thus been moved by the actuating lever $i$, will occupy a position to support the scale-beam in elevated position, when the actuating lever $i$ disengages the scale-beam, and will continue to thus support the scale-beam until it has been moved toward the left far enough to disengage the stud $j^2$, when the scale-beam will fall by gravity, resuming its normal position. The weight $j^5$ on the arm $j^4$ tends to return the prop to its normal position, and said weight acts to return the prop when the pressure upon the prop has been reduced to such an extent as to permit the said weight to act. The pressure upon the prop gradually diminishes as the counterpoises move along on the scale-beam bars toward the inner ends thereof or toward the point of balance. Owing to the curvature of the upper end of the prop, said prop will, however, act to further lift the scale-beam on its return movement, and as this is one of the important features of my invention, the weight $j^5$ is purposely made heavy enough to enable the prop to perform this additional function, in a manner to be hereinafter described. Hence the prop not only serves to hold the scale-beam in elevated position but also acts as an actuating-device for moving the scale-beam.

It is designed that one of the counterpoises, as $e$, for instance, shall be locked at the extreme outer end of the scale-beam bar, and shall be automatically released before or as soon as the scale-beam has been lifted by a weight on the platform, and when released shall be free to slide along on the scale-beam bar, toward the inner end thereof, to indicate the weight, and shall be again locked at intermediate position on said scale-beam bar it will occupy when indicating the weight, and thereafter shall be released and permitted to return to its normal position at the outer end of said scale-beam bar when the weight is removed from the platform. It is also designed that the other counterpoise, as $d$, shall be locked at the outer end of its scale-beam bar before or as soon as the counterpoise $e$ is first released, and shall be released after or as soon as the counterpoise $e$ is locked at an intermediate point on its bar, and when released, shall be free to slide along on its bar, toward the inner end thereof, to indicate the weight, and shall be again locked at intermediate positions on the bar it may occupy when indicating the weight, and thereafter shall be released, simultaneously with the counterpoise $e$, and permitted to return to its normal position, when the weight is removed from the platform.

To lock the counterpoise $e$ at the outer end of the scale-beam bar, a gravitating latch $e^{50}$ is pivoted to the counterpoise, preferably at its lower end, which is adapted to engage the upper end of the upright post $i^{30}$ on the actuating lever $i$, when said scale-beam and lever occupy their normal positions, and to continue in engagement with said post while said lever is lifted by the platform to lift the scale-beam and move the prop into position to engage the elevated scale-beam, but to disengage said post when said lever returns to its normal position, leaving the scale-beam supported upon the prop. Thus the counterpoise $e$ is normally locked at the outer end of the scale-beam bar by the upright post $i^3$ engaging the latch $e^{50}$ when there is no weight on the platform, but when a weight is placed on the platform and the scale-beam is moved into its elevated position, by the actuating-lever said counterpoise $e$ will be automatically released and permitted to slide along on the scale-beam bar to indicate the weight upon the return movement of said actuating-lever.

To lock the counterpoise $e$ in intermediate positions it may occupy on the scale-beam bar $a'$ when indicating the weight, a locking bar is provided on said scale-beam bar, represented at $e^{10}$. The locking bar consists of a flat metallic strip, extending lengthwise the scale-beam bar, from end to end thereof or thereabout, having its ends $e^{12}$ bent at right angles to thereby form a bale-shaped device, and said locking bar is loosely or pivotally connected to the scale-beam bar by pins passing through the bent ends thereof, so that it is freely movable up and down on its end supports. The locking bar $e^{10}$ has notches formed along one of its edges, at regular intervals, which correspond in position to the graduations on the scale-beam bar $a'$. The transverse opening through the counterpoise $e$, which receives the scale-beam bar, is made large enough to also receive said locking-bar and to provide for the up and down movement thereof, and said counterpoise has a tooth $e^5$ in said opening or elsewhere which is adapted to enter any one of the notches in said locking-bar when said bar is moved into engagement with it. The locking-bar is adapted to be raised and held in elevated position by means provided for the purpose, and when released to fall by gravity and lock the counterpoise. The locking-bar is normally held in elevated position by the upright post $e^{10}$ on the lever $e^8$, that is to say, when there is no weight on the platform, but when there is a weight on the platform said post $e^{10}$ will be drawn down and the locking-bar thereby released, yet said locking-bar does not fall by gravity and lock the counterpoise upon the withdrawal of said post $e^{10}$, as other means are provided for holding it in elevated position and also for controlling its operation. At the outer end of the scale-beam a controlling-device is provided for controlling the operation of the locking-bar $e^{10}$ upon the withdrawal of the post $e^{10}$, which is herein shown as a detent-lever adapted to coöperate with a fixed detent with respect to which it is movable. The detent-lever as herein shown for the purpose of illustration, is made as a bell-crank lever, and is placed between the two plates $a^3$, $a^3$, and pivoted thereto, thus being supported upon and carried by the scale-beam. The detent-lever has an arm $e^{20}$, see Figs. 4 and 5, which extends beneath one end of and is adapted to engage the locking-bar $e^{10}$, and an arm $e^{21}$, which bears a detent $e^{22}$, which extends laterally and projects through a hole $e^{23}$ in one of the plates $a^3$. A fixed detent $e^{24}$, with which said detent lever coöperates, is arranged or formed on an upright post $g$, which is erected on the frame-plate $w$, and which is located close to the scale-beam, near its outer end. The scale-beam moves up and down with respect to said post, hence the detent-lever or other form of controlling-device moves up and down with respect to the fixed detent. The arm $e^{20}$ of the detent-lever extends over a finger $i^{20}$, which is secured to the top of the post $i^2$ on the actuating lever $i$, and when said actuating lever is lifted to lift the scale-beam the detent-lever will be moved on its pivot, its arm $e^{20}$ moving into position to engage the pivoted locking-bar, and its arm $e^{21}$ moving into position for its detent $e^{22}$ to engage the detent $e^{24}$. The finger $i^{20}$ engages the detent-lever and moves slightly in advance of the post $i^{30}$, engaging the counter-poise $e$ and moving upward the scale-beam, in order that the same actuating lever may be employed for both purposes. The arm $e^{20}$ of the detent lever engages the locking-bar just as the post $e^{10}$ is removed from engagement therewith, so that said locking-bar will continue to be held in its elevated position upon the withdrawal of the post $e^{10}$. The actuating-lever $i$ bearing the post $i^2$ then falls by gravity. The detent $e^{22}$ at such time occupies a position on the right hand side of and in engagement with the fixed detent $e^{24}$, so as to hold the detent-lever in this position and hold the locking-bar elevated, while the counterpoise $e$, which was released when the actuating lever $i$ resumed its normal position, moves along on the scale-beam bar, toward the inner end thereof, to indicate the weight.

As the counterpoise $e$ moves along on the scale-beam bar to indicate the weight the pressure of the scale-beam on the prop or actuating-device $j$ is gradually diminished, and as soon as the said counterpoise arrives at a point on the bar to indicate the correct weight, it is intended that the locking-bar $e^{10}$ shall be released, and to accomplish this result the scale-beam is lifted farther just at this time by said prop or actuating device, such additional upward movement being sufficient to enable the detent $e^{22}$ to pass over and thereby disengage the fixed detent $e^{24}$. The detent-lever being thus released, the locking-bar $e^{10}$ instantly falls by gravity and engages the counterpoise $e$, and if one of the notches in said locking-bar is at such time opposite the tooth on the counterpoise, said tooth will enter the notch and the counterpoise will become locked, but otherwise the counterpoise will continue to slide along on the bar, notwithstanding the locking-bar engages it, until its tooth enters the next notch. In order that the prop or actuating-device may thus additionally lift the scale-beam, the weight thereon is adjusted to exert a force sufficient to lift the scale-beam with the counterpoise $d$ at the outer end thereof, when the counterpoise $e$ is at a point on the bar to indicate the correct weight. Thus, if the weight on the platform is 156 pounds the counterpoise $e$ will slide along on the bar until it arrives in a position thereon to indicate 156 pounds, but as the bar has ten pound graduations, it will not be locked until it arrives at the 150 pound mark. When the counterpoise $e$ arrived at the point to correctly indicate 156 pounds, the scale-beam would have been balanced, were it not for the counterpoise $d$, which is at the outer end of the scale-beam, hence the weight on the prop or actuating-device must exert a force sufficient to lift the scale-beam with the counterpoise $d$ at the outer end thereof, just at this time, in order to further lift the scale-beam so as to release the locking-bar. Assuming that the weight of the prop is adjusted to exert a force tending to lift the beam which is equal to the weight of the counterpoise $d$ at the moment the counterpoise $e$ arrives in position on the bar to indicate the correct weight, then the beam at such moment will balance, and if the locking-device for said counterpoise $e$ is released at this moment it will immediately engage the counterpoise. The counterpoise $e$, however, is heavy and attains a slight momentum in moving down the beam and therefore it moves by or beyond the point for indicating the correct weight before it can be stopped, hence the necessity of providing the second counterpoise $d$. The weight on the prop may, however, be adjusted so as not to exert a force on the beam exactly equal to the weight of the counterpoise $d$ at the moment the counterpoise $e$ arrives at the position on the bar to indicate the correct weight, and in such case the beam will not balance until the counterpoise $e$ has passed by the point for indicating the correct weight and the extent of this movement of the counterpoise $e$ as well as the moment of release of the locking-device may be regulated by adjustment of the weight on the prop. In fact the weight on the prop may be adjusted so as to lift the scale-beam and thereby control the release of the locking-device at any desired moment. The counterpoise $e$, which has thus been locked at an intermediate point on the scale-beam, will remain locked until the counterpoise $d$ has been moved along the scale-beam bar and has been similarly locked.

The counterpoise $d$, like the counterpoise $e$, normally occupies a position at the outer end of the scale-beam bar, although it is not normally locked, but when the scale-beam is lifted said counterpoise $d$ is instantly locked to prevent it from sliding along on the scale-beam bar. To thus lock the counterpoise $d$, a latch $h$ is provided, which is placed between the two end plates $a^3$, $a^3$, on the scale-beam and is pivoted thereto, and is made long enough to project beneath the counterpoise $d$, although it normally does not engage said counterpoise, and said latch $h$ is connected by the link $h'$ with the arm $e^{20}$ of the detent-lever above described, so that when said arm $e^{20}$ is raised by the finger $i^{20}$ on the post $i^2$ of the actuating lever $i$, said latch will be moved into engagement with the counterpoise $d$, and will thereby lock said counterpoise until said detent-lever is disengaged from the fixed detent $e^{24}$. Thus the counterpoise $d$ will be instantly locked the moment the scale-beam is lifted, and will remain locked while the counterpoise $e$ slides along on the scale-beam bar, and until the detent-lever disengages the detent $e^{24}$ and thereby releases the locking-bar $e^{10}$, and locks the counterpoise $e$, when, it will be observed, said counterpoise $d$ will be released.

The counterpoise $d$, when released and permitted to slide along on the scale-beam bar, is locked at points intermediate the length of the bar to indicate the weight by a locking-bar $d^{10}$, which is made substantially like the locking-bar $e^{10}$, and which is likewise pivotally connected at its opposite ends to the scale-beam bar, and also extends through the transverse opening in the counterpoise $d$, and is movable up and down in said opening, and is notched at regular intervals to correspond to the graduations on the bar, and is adapted to engage a tooth $d^5$ which is provided in the opening in said counterpoise $d$, or elsewhere in said counterpoise. The locking-bar $d^{10}$ is normally held in elevated position by an upright post $d^{15}$ engaging it, which is attached to the locking-bar $e^{10}$, but when the locking-bar $e^{10}$ falls by gravity and locks the counterpoise $e$, said post $d^{15}$ will be withdrawn from the locking-bar $d^{10}$, but said locking-bar $d^{10}$ will not fall by gravity and lock the counterpoise $d$ at such time because a controlling-device is provided for holding it in elevated position, and also for controlling its operation. This controlling-device consists of a detent-lever which is placed between the plates $a^3$, $a^3$, of the scale-beam and is pivoted thereto, and one arm, as $d^{20}$, of said lever occupies a position beneath one end of the locking-bar $d^{10}$, and is adapted to engage said locking-bar and to control its movements, and the other arm, $d^{21}$, of said detent-lever bears a detent $d^{22}$ at its extremity which projects through a hole in one of the plates $a^3$, and is adapted to coöperate with a fixed detent $d^{24}$ on the stationary post $g$, said fixed detent being located a short distance above the fixed detent $e^{24}$. The detent-carrying arm $d^{21}$ normally occupies a position at the right hand side of the detent $d^{24}$, but when the scale-beam is lifted it is moved to a position at the left hand side of said detent and also into engagement therewith. To thus move the detent-lever, a lever $f$ is provided, which is located between the two plates $a^3$, $a^3$, and which is pivoted thereto, at a point intermediate its length, and the upper end of said lever bears upon the detent-carrying arm $d^{21}$ and the lower end of said lever bears upon the detent-carrying arm $e^{21}$ of the other detent-lever, and as the detent-carrying arm $e^{21}$ is moved, by the means employed for lifting the scale-beam, the detent-carrying arm $d^{21}$ will be moved to the opposite side of the fixed detent $d^{24}$, and the arm $d^{20}$ will be moved into position to engage and support the locking-bar $d^{10}$ in its elevated position. Thus, when the post $d^{15}$ is withdrawn from its engagement with the locking-bar $d^{10}$, said locking-bar will continue to be held in elevated position by the detent arm $d^{20}$.

When the locking-bar $e^{10}$ is operated to lock the counterpoise $e$ at an intermediate point on the scale-beam bar, the latch $h$ is instantly operated to release the counterpoise $d$. As said counterpoise $d$ moves along on its scale-beam bar to indicate the weight, the pressure of the scale-beam upon the prop or actuating-device $j$ is gradually further diminished, but the stud $j^3$ on the scale-beam is, at such time, in engagement with a very steep part of the curved end of the prop or actuating-device, and as a result a proportional greater power is required to move the prop or actuating-device at such time, hence during such time the prop or actuating-device will exert a force tending to lift the scale-beam, which is only sufficient to lift the beam itself. Consequently, as the pressure on the prop or actuating-device gradually diminishes, said prop or actuating-device will not act to lift the scale-beam until the counterpoise $d$ has arrived at a point on the scale-beam bar to indicate the correct weight, or in other words until it has arrived in position to balance the beam if the beam was not held in elevated position by the prop or actuating-device $j$. Just at this time the pressure of the scale-beam on the prop or actuating-device has been reduced to the weight of the beam itself, and at such time the prop or actuating-device will act to further lift the scale-beam, and such further upward movement is sufficient for the detent $d^{22}$ to pass over and thereby disengage the fixed detent $d^{24}$, when the locking-bar $d^{10}$ will be immediately released and permitted to fall by gravity, and lock the counterpoise $d$ at intermediate positions on the scale-beam it will occupy at such time. Assuming, the weight to be 156 pounds on the platform, as in the example before stated, and the counterpoise $e$ locked at 150 pounds, the counterpoise $d$ will slide along on the scale-beam bar until it arrives at the 6 pound mark and will then become locked. Thus both counterpoises $e$ and $d$ are locked on the scale-beam bars by the gravitating locking-bars $e^{10}$ and $d^{10}$, and will remain locked thereon until said locking-bars are raised to release them. As soon as its prop or actuating-device $j$ has been moved by its weighted arm sufficiently to lift the scale-beam high enough for the detent-lever to release the locking-bar $d^{10}$, its duty is performed, and the weighted arm will then return the prop or actuating-device to its normal position at the left hand side of the stud $j^3$, thereby disengaging the scale-beam, permitting it to assume a balanced position.

Assuming that the weight still remains on the platform the counterpoises will still remain locked at intermediate points on the scale-beam bars, and the scale-beam will still occupy a balanced position, but as soon as the weight is removed from the platform $c$, the scale-beam resumes its normal position, and the upright post $c^{10}$ lifts the locking-bar $e^{10}$, and the upright post $d^{15}$ which is attached thereto lifts the locking-bar $d^{10}$, thereby simultaneously releasing the two counterpoises $e$ and $d$, permitting them to slide along on the scale-beam bars until they arrive at the extreme outer ends thereof, when the lower counterpoise $c$ will become again locked by the gravitating latch engaging the upper end of the post $i^{30}$. The two automatically operated counterpoises are therefore released successively, first one and then the other moving along on its scale-beam bar, toward the inner end thereof, to indicate the weight, becoming locked when the scale-beam balances, and thereafter both counterpoises are simultaneously released and permitted to resume their normal positions at the outer end of the scale-beam.

The frame-plate $w$ is horizontally disposed in the head of the machine and is pivotally supported at a point intermediate its length, as at $w'$, so that it may be adjusted on said pivot, and at one end of said frame-plate $w$, an adjusting screw $w^2$ is provided which is supported by a fixed plate $w^3$ and which has its screw threaded end extended through a screw threaded hole in the frame-plate $w$, and by turning said screw the frame-plate may be adjusted on its pivot.

In lieu of constructing the counterpoise $d$ as a block which is arranged to slide freely on the scale-beam bar, it may be made as a spherical body or ball $d^{50}$, as shown in Fig. 12, and the scale-beam bar formed with a groove in its upper edge adapted to receive said ball, and a locking bar $d^{60}$ is provided, adapted to operate by gravity to frictionally engage the ball and thereby lock it at any intermediate point on the scale-beam bar.

I do not desire to limit my invention to the particular means herein shown for carrying out my invention, as it is obvious that the construction and arrangement of many of the parts may be varied without departing from its spirit and scope.

The spherical counterpoise and means for locking it at any intermediate position on the scale-beam, shown in Fig. 12, merely illustrates a modification of my invention, and such features are not herein specifically claimed, as the same are embodied in another application Serial No. 342,632, filed November 9th, 1906.

Having thus described my invention, what I claim as new and desire to secure by Letters Patent is:—

1. In a weighing machine, a pivoted scale-beam, a counterpoise, normally occupying a position at the outer end of said scale-beam, means for lifting the scale-beam to cause the counterpoise to move along thereon toward the inner end thereof to indicate the weight, means for holding the scale-beam in elevated position while the counterpoise moves along thereon to indicate the weight and for releasing it when it is balanced by said counterpoise, and means for locking the counterpoise at intermediate positions on the scale-beam, substantially as described.

2. In a weighing machine, a pivoted scale-beam, a counterpoise normally occupying a position at the outer end of the scale-beam, means for lifting the scale-beam to an elevated position to cause the counterpoise to move along thereon to indicate the weight, a prop for holding the scale-beam in its elevated position while the counterpoise moves along to indicate the weight and for releasing said scale-beam when the latter is balanced by said counterpoise, and means for locking the counterpoise at intermediate positions on the scale-beam, substantially as described.

3. In a weighing machine, a platform, a pivoted scale-beam, an automatically operated counterpoise normally occupying a position at the outer end of the scale-beam, means, connected with and operated by the platform, for moving the scale-beam to an elevated position to enable the counterpoise to move along thereon toward the inner end thereof to indicate the weight, means for holding the scale-beam elevated until it is balanced by the counterpoise, and means for locking the counterpoise at intermediate positions on the scale-beam, substantially as described.

4. In a weighing machine, a pivoted scale-beam, normally declining toward its outer end, an automatically operated counterpoise thereon, means connected with and operated by the platform for lifting the scale-beam to an elevated position, to enable the counterpoise to move along thereon to indicate the weight, means for holding the scale-beam elevated while the counterpoise thus moves along thereon and for thereafter releasing it, and means for locking the counterpoise at intermediate positions on the scale-beam, substantially as described.

5. In a weighing machine, a platform, a pivoted scale-beam normally declining toward its outer end, a counterpoise on said scale-beam, means, operated by the platform, for lifting the outer end of the scale-beam to cause the counterpoise to move along thereon toward the inner end thereof and means for holding the scale-beam in elevated position until it is balanced by said counterpoise, substantially as described.

6. In a weighing machine, a platform, a pivoted scale-beam normally declining toward its outer end, a counterpoise on said scale-beam, means, operated by the platform, for lifting the outer end of the scale-beam to cause the counterpoise to move along thereon toward the inner end thereof, means for holding the scale-beam in elevated position while the counterpoise moves along thereon to indicate the weight and for thereafter releasing it, and means for locking the counterpoise at intermediate positions on the scale-beam, substantially as described.

7. In a weighing machine, a pivoted scale-beam normally declining toward its outer end, an automatically operated counterpoise thereon, an actuating-lever for lifting the scale-beam to an elevated position to enable the counterpoise to move along thereon toward the inner end thereof to indicate the weight, means for moving said actuating-lever to thus lift the scale-beam, and means for locking said counterpoise at intermediate positions on the scale-beam, substantially as described.

8. In a weighing machine, a pivoted scale-beam, normally declining toward its outer end, an automatically operated counterpoise thereon, an actuating-lever for lifting the scale-beam to an elevated position, to enable the counterpoise to move along thereon to indicate the weight, means, connected with the platform, for moving said actuating-lever to thus lift the scale-beam, and means for locking the counterpoise at intermediate positions on the scale-beam, substantially as described.

9. In a weighing machine, a platform, a pivoted scale-beam, normally declining toward its outer end, an automatically operated counterpoise thereon, an actuating-lever for lifting the outer end of the scale-beam to an elevated position to enable the counterpoise to move along thereon toward the inner end thereof to indicate the weight, means, operated by the platform, for moving said actuating-lever to lift the scale-beam, means for holding the scale-beam elevated until balanced by said counterpoise, and means for locking the counterpoise at intermediate positions on the scale-beam, substantially as described.

10. In a weighing machine, a pivoted scale-beam, normally declining toward its outer end, an automatically operated counterpoise thereon, an actuating-lever for lifting the scale-beam to an elevated position, to enable the counterpoise to move along thereon to indicate the weight, and means, connected with the platform, for moving said actuating-lever to thus lift the scale-beam, means for holding the scale-beam elevated while the counterpoise thus moves along thereon and for thereafter releasing it, and means for locking the counterpoise at intermediate positions on the scale-beam, substantially as described.

11. In a weighing machine, a pivoted scale-beam, normally declining toward its outer end, an automatically operated counterpoise thereon, an actuating-lever for lifting the scale-beam to an elevated position, to enable the counterpoise to move along thereon to indicate the weight, means, connected with the platform, for moving said actuating-lever to thus lift the scale-beam, means, connected with and operated by said actuating-lever, for holding the scale-beam elevated while the counterpoise thus moves along on the scale-beam and for thereafter releasing it, and means for locking the counterpoise at intermediate positions on the scale-beam, substantially as described.

12. In a weighing machine, a pivoted scale-beam, normally declining toward its outer end, an automatically operated counterpoise thereon, means for lifting the scale-beam to an elevated position to enable the counterpoise to move along thereon to indicate the weight, a prop for holding the scale-beam in its elevated position, means for moving said prop into position to thus hold the scale-beam, and means for locking the counterpoise at intermediate positions on the scale-beam, substantially as described.

13. In a weighing machine, a pivoted scale-beam, normally declining toward its outer end, an automatically operated counterpoise thereon, means, connected with and operated by the platform, for lifting the scale-beam to an elevated position, to enable the counterpoise to move along thereon to indicate the weight, a prop for holding the scale-beam in its elevated position, means, connected with and operated by the platform, for moving said prop into position to thus hold the scale-beam, and means for locking the counterpoise at intermediate positions on the scale-beam, substantially as described.

14. In a weighing machine, a pivoted scale-beam, normally declining toward its outer end, an automatically operated counterpoise thereon, an actuating-lever for lifting the scale-beam to an elevated position, to enable the counterpoise to move along thereon to indicate the weight, means, connected with the platform, for moving said actuating-lever to lift the scale-beam, a prop for holding the scale-beam in its elevated position, means, connected with said actuating-lever, for moving said prop into position to thus hold the scale-beam, and means for locking the counterpoise at intermediate positions on the scale-beam, substantially as described.

15. In a weighing machine, a pivoted scale-beam, normally declining toward its outer end, an automatically operated counterpoise thereon, means for lifting the scale-beam to an elevated position to enable the counterpoise to move along thereon to indicate the weight, a prop for holding the scale-beam in its elevated position, means for moving said prop into position to thus hold the scale-beam, means for returning said prop to its normal position to release the scale-beam when the pressure upon it is diminished by the counterpoise moving along on the scale-beam far enough to indicate the weight, and means for locking the counterpoise at intermediate positions on the scale-beam, substantially as described.

16. In a weighing machine, a pivoted scale-beam, normally declining toward its outer end, an automatically operated counterpoise thereon, means, connected with and operated by the platform, for lifting the scale-beam to an elevated position to enable the counterpoise to move along thereon to indicate the weight, a prop for holding the scale-beam in its elevated position, means, connected with and operated by the platform, for moving said prop into position to thus hold the scale-beam, means for returning said prop to its normal position to release the scale-beam when the pressure upon it is diminished by the counterpoise moving along on the scale-beam far enough to indicate the weight, and means for locking the counterpoise at intermediate positions on the scale-beam, substantially as described.

17. In a weighing machine, a pivoted scale-beam, normally declining toward its outer end, an automatically operated counterpoise thereon, means for lifting the scale-beam to an elevated position, to enable the counterpoise to move along thereon to indicate the weight, a prop for holding the scale-beam in its elevated position, having a weighted arm for operating it when the pressure upon it is reduced, means for moving said prop into position to engage the elevated scale-beam, and means for locking the counterpoise at intermediate positions on the scale-beam, substantially as described.

18. In a weighing machine, a pivoted scale-beam normally declining toward its outer end, an automatically operated counterpoise thereon, an actuating-lever for lifting the scale-beam to enable the counterpoise to move along thereon, and a prop for holding the scale-beam in its elevated position, which is moved by said actuating-lever into position to engage the elevated scale-beam, substantially as described.

19. In a weighing machine, a pivoted scale-beam, normally declining toward its outer end, an automatically operated counterpoise thereon, means for lifting the scale-beam means for holding the scale-beam elevated to enable the counterpoise to move along thereon and means for moving said holding means to release said scale-beam when the pressure upon said holding means is removed, substantially as described.

20. In a weighing machine, a pivoted scale-beam, normally declining toward its outer end, an automatically operated counterpoise thereon, means for lifting said scale-beam a prop for holding the scale-beam elevated to enable the counterpoise to move along thereon, and means for moving said prop to release the scale-beam when the pressure upon the prop is removed, substantially as described.

21. In a weighing machine, a pivoted scale-beam, normally declining toward its outer end, an automatically operated counterpoise thereon, means for lifting said scale-beam a prop for holding the scale-beam elevated to enable the counterpoise to move along thereon, means for moving the prop into position to engage the scale-beam, and means for moving said prop to release the scale-beam when the pressure upon the prop is removed, substantially as described.

22. In a weighing machine, the combination of a pivoted scale-beam normally declining toward its outer end, an automatically operated counterpoise thereon, a locking-device arranged at the outer end of the scale-beam for engaging and locking the counterpoise at the outer end thereof, and means for lifting the scale-beam to cause the counterpoise to move along thereon toward the inner end thereof and for releasing said counterpoise at such time permitting it to move along the beam, substantially as described.

23. In a weighing machine, the combination of a platform, a pivoted scale-beam connected therewith, an automatically operated counterpoise on said beam, means for locking said counterpoise at the outer end of the beam, and means, operated by a downward movement of said platform for releasing said counterpoise permitting it to move along the beam, substantially as described.

24. In a weighing machine, the combination of a pivoted scale-beam, an automatically operated counterpoise thereon, means for lifting the scale-beam to an elevated position, a locking-device for engaging and thereby locking the counterpoise at the outer end of the scale-beam, means for operating said locking-device to release the counterpoise after the scale-beam is lifted, substantially as described.

25. In a weighing machine, the combination of a pivoted scale-beam, an automatically operated counterpoise thereon, and a gravitating locking-bar for engaging and locking said counterpoise in intermediate positions on the scale-beam, substantially as described.

26. In a weighing machine, the combination of a pivoted scale-beam, an automatically operated counterpoise thereon, and a locking-bar, arranged in parallelism with the scale-beam, which is movable into and out of engagement with said counterpoise, substantially as described.

27. In a weighing machine, the combination of a pivoted scale-beam, an automatically operated counterpoise thereon, a pivoted locking-bar arranged in parallelism with the scale-beam and movable into and out of engagement with said counterpoise, said locking-bar having notches corresponding to the graduations of the scale-beam, and said counterpoise having a tooth adapted to enter any one of the notches of the locking-bar, substantially as described.

28. In a weighing machine, a pivoted scale-beam, an automatically operated counterpoise thereon, means for locking said counterpoise at the outer end of the scale-beam, means for releasing it, permitting it to move along the scale-beam, and a locking-device for locking said counterpoise at an intermediate position on the scale-beam, substantially as described.

29. In a weighing machine, a pivoted scale-beam, normally declining toward its outer end, an automatically operated counterpoise thereon, means for lifting the scale-beam to enable the counterpoise to move along thereon to indicate the weight, means for holding the scale-beam elevated while the counterpoise moves along thereon and until said scale-beam is balanced by the counterpoise and means for locking the counterpoise at intermediate positions on the scale-beam, substantially as described.

30. In a weighing machine, a pivoted scale-beam, normally declining toward its outer end, an automatically operated counterpoise thereon, means for lifting the scale-beam to enable the counterpoise to move along thereon to indicate the weight, means for holding the scale-beam elevated while the counterpoise moves along thereon and for releasing it when the beam is balanced by said counterpoise, a locking-device for locking the counterpoise at intermediate positions on the scale-beam, means for holding said locking-device in its unlocking position, and means for releasing said locking-device, thereby permitting it to operate, substantially as described.

31. In a weighing machine, a pivoted scale-beam, normally declining toward its outer end, an automatically operated counterpoise thereon, means for lifting the scale-beam to enable the counterpoise to move along thereon to indicate the weight, means for holding the scale-beam elevated while the counterpoise moves along thereon and for releasing it when the scale-beam is balanced by the counterpoise, and means for locking the counterpoise at intermediate positions on the scale-beam when the scale-beam is balanced by the counterpoise, substantially as described.

32. In a weighing machine, a pivoted scale-beam, normally declining toward its outer end, an automatically operated counterpoise thereon, means for lifting the scale-beam to enable the counterpoise to move along thereon to indicate the weight, means for holding the scale-beam elevated while the counterpoise moves along thereon and for releasing it when the scale-beam is balanced by the counterpoise, means for locking the counterpoise at intermediate positions on the scale-beam, and means for subsequently releasing said counterpoise permitting it to return to its normal position, substantially as described.

33. In a weighing machine, a platform, a pivoted scale-beam, normally declining toward its outer end, an automatically operated counterpoise thereon, means, operated by the downwardly moving platform, for lifting the scale-beam to enable the counterpoise to move along thereon to indicate the weight, means for holding the scale-beam elevated while the counterpoise moves along thereon and for releasing it when the scale-beam is balanced by the counterpoise, means for locking the counterpoise at intermediate positions on the scale-beam, and means, operated by the rising platform, for subsequently releasing said counterpoise permitting it to return to its normal position, substantially as described.

34. In a weighing machine, a platform, a pivoted scale-beam, normally declining toward its outer end, a counterpoise normally occupying a position at the outer end of the scale-beam, a locking-device for locking said counterpoise at the outer end of the scale-beam, means, operated by the downwardly moving platform, for moving the scale-beam into an elevated position to enable the counterpoise to move along thereon to indicate the weight and also for releasing said locking-device, means for holding the scale-beam elevated while the counterpoise moves along thereon and for releasing it when the scale-beam is balanced by the counterpoise, means for locking the counterpoise at intermediate positions on the scale-beam, and means, operated by the rising platform, for subsequently releasing said counterpoise, permitting it to move along on the scale-beam and resume its normal position, substantially as described.

35. In a weighing machine, a pivoted scale-beam, a counterpoise normally occupying a position at the outer end thereof, means for lifting the scale-beam to cause the counterpoise to move along thereon toward the inner end thereof to indicate the weight, an actuating-device for holding the scale-beam in elevated position while the counterpoise moves along thereon and for lifting it as the pressure upon said actuating-device diminishes, and means for locking the counterpoise at intermediate positions on the scale-beam, substantially as described.

36. In a weighing machine, a pivoted scale-beam, an automatically operated counterpoise thereon, a locking-device adapted to engage the counterpoise at intermediate positions on the scale-beam, means operated by a movement of the scale-beam for controlling the operation of said locking-device, and an actuating-device for the scale-beam, which supports it in elevated position and which lifts it when the pressure of the scale-beam upon said actuating-device is diminished, substantially as described.

37. In a weighing machine, a pivoted scale-beam, an automatically operated counterpoise thereon, a locking-device adapted to engage the counterpoise at intermediate positions on the scale-beam, means operated by a movement of the scale-beam for controlling the operation of said locking-device, an actuating-device which supports the scale-beam in elevated position and which lifts it when the pressure of the scale-beam on said actuating-device is diminished, and means for lifting the scale-beam into position to be engaged by said actuating-device, substantially as described.

38. In a weighing machine, a pivoted scale-beam, an automatically operated counterpoise thereon, a locking-device adapted to engage the counterpoise at intermediate positions on the scale-beam, means operated by a movement of the scale-beam for controlling the operation of said locking-device, an actuating-device which supports the scale-beam in elevated position and which lifts it when the pressure of the scale-beam thereon is diminished, means for lifting the scale-beam into position to be engaged by said actuating-device, and means for moving the actuating-device into position to engage the elevated scale-beam, substantially as described.

39. In a weighing machine, a pivoted scale-beam, an automatically operated counterpoise thereon, a locking-device adapted to engage the counterpoise at intermediate positions on the scale-beam, means operated by a movement of the scale-beam for controlling the operation of said locking-device, and independent means for controlling the position of said scale-beam, substantially as described.

40. In a weighing machine, a pivoted scale-beam, an automatically operated counterpoise thereon, a locking-device adapted to lock said counterpoise at intermediate positions on the scale-beam, a controlling-device for said locking-device borne by the scale-beam, a fixed member on the frame with which said controlling-device coöperates and with respect to which it is moved by the scale-beam, and an actuating-device for the scale-beam, which supports it and moves it when the pressure of the scale-beam thereupon is diminished, substantially as described.

41. In a weighing machine, a pivoted scale-beam, an automatically operated counterpoise thereon, a locking-device adapted to lock said counterpoise at intermediate positions on the scale-beam, a controlling-device for controlling the operation of said locking-device, borne by the scale-beam, and a fixed member on the frame with which said controlling-device coöperates and with respect to which it is moved by the scale-beam, and means for moving said controlling-device into engagement with said fixed member, substantially as described.

42. In a weighing machine, a pivoted scale-beam, an automatically operated counterpoise thereon, a locking-device adapted to lock said counterpoise at intermediate positions on the scale-beam, a controlling-device for controlling the operation of said locking-device, borne by the scale-beam, a fixed member on the frame with which said controlling-device coöperates and with respect to which it is moved by the scale-beam, and means for lifting the scale-beam and for moving said controlling-device into engagement with said fixed member, substantially as described.

43. In a weighing machine, a pivoted scale-beam, an automatically operated counterpoise thereon, a locking-device adapted to lock said counterpoise at intermediate positions on the scale-beam, a controlling-device for controlling the operation of said locking-device, borne by the scale-beam, a fixed member on the frame with which said controlling-device coöperates and with respect to which it is moved by the scale-beam, and means, operated by depressing the platform, for lifting the scale-beam and for moving said controlling-device into engagement with said fixed member, substantially as described.

44. In a weighing machine, a pivoted scale-beam, an automatically operated counterpoise thereon, a locking-device adapted to lock said counterpoise at intermediate positions on the scale-beam, a controlling-device for controlling the operation of said locking-device, borne by the scale-beam, a fixed member on the frame with which said controlling-device coöperates and with respect to which it is moved by the scale-beam, means for lifting the scale-beam and for moving said controlling-device into engagement with said fixed member, and means for holding the scale-beam in elevated position while the counterpoise moves along thereon to indicate the weight, substantially as described.

45. In a weighing machine, a pivoted scale-beam, an automatically operated counterpoise thereon, a locking-device adapted to lock said counterpoise at intermediate positions on the scale-beam, a controlling-device for controlling the operation of said locking-device, borne by the scale-beam, a fixed member on the frame with which said controlling device coöperates and with respect to which it is moved by the scale-beam, means, operated by depressing the platform, for lifting the scale-beam and for moving said controlling-device into engagement with said fixed member, an actuating-device for holding the scale-beam in elevated position while the counterpoise moves along on the scale-beam, to indicate the weight, and for moving said scale-beam when the pressure of the scale-beam on said device is diminished, substantially as described.

46. In a weighing machine, a pivoted scale-beam, an automatically operated counterpoise thereon, a locking-device adapted to lock said counterpoise at intermediate positions on the scale-beam, a controlling-device, for controlling the operation of said locking-device, borne by the scale-beam, a fixed detent on the frame with which said controlling-device coöperates and with respect to which it is moved by the scale-beam, means, operated by depressing the platform, for lifting the scale-beam and for moving said controlling-device into engagement with said fixed member, an actuating-device for holding the scale-beam in elevated position while the counterpoise moves along thereon to indicate the weight and for moving said scale-beam when the pressure of the scale-beam upon it is diminished, and means, operated by depressing the platform, for moving said actuating-device into position to engage the elevated scale-beam, substantially as described.

47. In a weighing machine, a pivoted scale-beam, an automatically operated counterpoise thereon, a locking-device adapted to engage and lock the counterpoise at intermediate positions on the scale-beam, a movable detent-lever governing the action of said locking-device, and a detent fixed with respect to said detent-lever into and out of engagement with which said detent-lever is movable, substantially as described.

48. In a weighing machine, a pivoted scale-beam, an automatically operated counterpoise thereon, a locking-device adapted to lock said counterpoise at intermediate positions on the scale-beam, a detent-lever borne by the scale-beam, for controlling the operation of said locking-device, and a fixed detent on the frame with which said detent-lever coöperates and with respect to which it is moved by the scale-beam, substantially as described.

49. In a weighing machine, a pivoted scale-beam, an automatically operated counterpoise thereon, a locking-device adapted to lock said counterpoise at intermediate positions on the scale-beam, a detent-lever borne by the scale-beam, for controlling the operation of said locking-device, a fixed detent on the frame with which said detent-lever coöperates and with respect to which it is moved by the scale-beam, and means for moving said detent-lever into engagement with said fixed detent, substantially as described.

50. In a weighing machine, a pivoted scale-beam, an automatically operated counterpoise thereon, a locking-device adapted to lock said counterpoise at intermediate positions on the scale-beam, a detent-lever borne by the scale-beam, for controlling the operation of said locking-device, a fixed detent on the frame with which said detent-lever coöperates and with respect to which it is moved by the scale-beam, and means for lifting the scale-beam and for moving said detent-lever into engagement with said fixed detent, substantially as described.

51. In a weighing machine, a pivoted scale-beam, an automatically operated counterpoise thereon, a locking-device adapted to lock said counterpoise at intermediate positions on the scale-beam, a detent-lever borne by the scale-beam, for controlling the operation of said locking-device, a fixed detent on the frame with which said detent-lever coöperates and with respect to which it is moved by the scale-beam, and means for lifting the scale-beam and for moving said detent-lever into engagement with said fixed detent, and means for holding the scale-beam in elevated position while the counterpoise moves along thereon to indicate the weight, substantially as described.

52. In a weighing machine, a pivoted scale-beam, an automatically operated counterpoise thereon, a locking-device adapted to lock said counterpoise at intermediate positions on the scale-beam, a detent-lever borne by the scale-beam, for controlling the operation of said locking-device, a fixed detent on the frame with which said detent-lever coöperates and with respect to which it is moved by the scale-beam, and means, operated by depressing the platform, for lifting the scale-beam and for moving said detent-lever into engagement with said fixed detent, substantially as described.

53. In a weighing machine, a pivoted scale-beam, an automatically operated counterpoise thereon, a locking-device adapted to lock said counterpoise at intermediate positions on the scale-beam, a detent-lever borne by the scale-beam, for controlling the operation of said locking-device, a fixed detent on the frame with which said detent-lever coöperates and with respect to which it is moved by the scale-beam, means operated by depressing the platform, for lifting the scale-beam and for moving said detent-lever into engagement with said fixed detent, an actuating-device for holding the scale-beam in elevated position while the counterpoise moves along thereon to indicate the weight and for moving said scale-beam as the pressure of the scale-beam thereupon is reduced, substantially as described.

54. In a weighing machine, a pivoted scale-beam, an automatically operated counterpoise thereon, a locking-device adapted to lock said counterpoise at intermediate positions on the scale-beam, a detent-lever borne by the scale-beam for controlling the operation of said locking-device, a fixed detent on the frame with which said detent-lever coöperates and with respect to which it is moved by the scale-beam, means, operated by depressing the platform, for lifting the scale-beam and for moving said detent-lever into engagement with said fixed detent, an actuating-device for holding the scale-beam in elevated position while the counterpoise moves along thereon to indicate the weight and for moving said scale-beam when the pressure of the scale-beam upon it is reduced, and means for moving said actuating-device into position to engage the elevated scale-beam, substantially as described.

55. In a weighing machine, a pivoted scale-beam, an automatically operated counterpoise thereon, a locking-device adapted to engage the counterpoise at intermediate positions on the scale-beam, means for holding said locking-device in unlocking position, which when operated releases said locking-device, permitting it to engage the counterpoise, controlling-means for said holding means, and means for subsequently moving said locking-device into unlocking position to release the counterpoise, substantially as described.

56. In a weighing machine, a platform, a pivoted scale-beam, an automatically operated counterpoise thereon, a locking-device adapted to engage the counterpoise at intermediate positions on the scale-beam, means for holding said locking-device in unlocking position, which when operated releases said locking-device permitting it to engage the counterpoise, controlling means for said holding means, and means, operated by elevating the platform, for subsequently moving said locking-device into its unlocking position to release the counterpoise, substantially as described.

57. In a weighing machine, a pivoted scale-beam, comprising two parallel scale-beam bars arranged one above the other and connected together, two automatically operated counterpoises arranged one on each bar and movable thereon to indicate the weight, means for successively controlling their movements, and locking-devices for locking said counterpoises at intermediate positions on said bars, substantially as described.

58. In a weighing machine, a platform, a pivoted scale-beam comprising two parallel scale-beam bars arranged one above the other and connected together, two automatically operated counterpoises, arranged one on each bar, and movable thereon to indicate the weight, means, operated by a weight on the platform, for successively controlling their movements, and locking devices for locking said counterpoises at intermediate positions on said bars, substantially as described.

59. In a weighing machine, a pivoted scale-beam comprising two parallel scale-beam bars, arranged one above the other and connected together, two counterpoises respectively occupying positions at the outer ends of said bars, means for lifting the scale-beam to cause the counterpoises to move along on the scale-beam bars toward the inner ends thereof to indicate the weight, and locking-devices for locking said counterpoises at intermediate positions on said bars, substantially as described.

60. In a weighing machine, a pivoted scale-beam, normally declining toward its outer end, having two scale-beam bars, two automatically operated counterpoises arranged one on each bar, means for lifting the scale-beam to cause the counterpoises to move along on the scale-beam bars to indicate the weight, locking-devices for locking said counterpoises at intermediate positions on said bars, and means for holding the scale-beam elevated until it is balanced by said counterpoises, substantially as described.

61. In a weighing machine, a pivoted scale-beam, normally declining toward its outer end, having two scale-beam bars, two automatically operated counterpoises arranged one on each bar, means for lifting the scale-beam to cause the counterpoises to move along on the scale-beam bars to indicate the weight, locking devices for locking said counterpoises at intermediate positions on said bars, and means for holding the scale-beam elevated while the counterpoises move along on the scale-beam bars and for releasing it when it is balanced by said counterpoises, substantially as described.

62. In a weighing machine, a platform, a pivoted scale-beam, normally declining toward its outer end, having two scale-beam bars, two automatically operated counterpoises arranged on each bar, means, operated by the platform, for lifting the scale-beam to cause the counterpoises to move along on the scale-beam bars to indicate the weight, locking-devices for locking said counterpoises at intermediate positions on said bars, and means for holding the scale-beam elevated until the beam is balanced by said counterpoises and for thereafter releasing it, substantially as described.

63. In a weighing machine, a platform, a pivoted scale-beam, normally declining toward its outer end, having two scale-beam bars, two automatically operated counterpoises arranged one on each bar, means, operated by the platform, for lifting the scale-beam to cause the counterpoises to move along on the scale-beam bars to indicate the weight, means for holding the scale-beam elevated until it is balanced by said counterpoises and for thereafter releasing it, and a locking-device for each counterpoise adapted to lock said counterpoises at intermediate positions on the bar, substantially as described.

64. In a weighing machine, a pivoted scale-beam, having two scale-beam bars, two automatically operated counterpoises arranged one on each bar, a locking-device for each counterpoise, adapted to engage the counterpoise at intermediate positions on the scale-beam bar, means operated by a movement of the scale-beam for controlling the operation of said locking-devices, and independent means for controlling the position of the scale-beam, substantially as described.

65. In a weighing machine, a pivoted scale-beam, having two scale-beam bars, two automatically operated counterpoises arranged one on each bar, a locking-device for each counterpoise, adapted to engage the counterpoise at intermediate positions on the scale-beam bar, means operated by a movement of the scale-beam for controlling the operation of said locking-devices, an actuating-device for holding the scale-beam in elevated position and for lifting it when the pressure of the scale-beam upon it is reduced, substantially as described.

66. In a weighing machine, a pivoted scale-beam, having two scale-beam bars, two automatically operated counterpoises arranged one on each bar, a locking-device for each counterpoise, adapted to engage the counterpoise at intermediate positions on the scale-beam bar, means operated by a movement of the scale-beam for controlling the operation of said locking-devices, and independent means for controlling the position of the scale-beam, substantially as described.

67. In a weighing machine, a pivoted scale-beam, having two scale-beam bars, two automatically operated counterpoises arranged one on each bar, a locking-device for each counterpoise for locking it at intermediate positions on the scale-beam bar, a controlling-device for each locking-device, and means for operating said controlling-devices to successively release the locking-devices to lock the counterpoises, substantially as described.

68. In a weighing machine, a pivoted scale-beam, having two scale-beam bars, two automatically operated counterpoises arranged one on each bar, a locking-device for each counterpoise, for locking it at intermediate positions on the scale-beam bar, a controlling-device for each locking-device, borne by the scale-beam, and fixed members on the frame with which said controlling-devices coöperate and with respect to which they are moved by the scale-beam, substantially as described.

69. In a weighing machine, a pivoted scale-beam, having two scale-beam bars, two automatically operated counterpoises arranged one on each bar, a locking-device for each counterpoise, for locking it at intermediate positions on the scale-beam bar, a controlling-device for each locking-device, borne by the scale-beam, and fixed members on the frame with which said controlling-devices coöperate and with respect to which they are moved by the scale-beam, and means for moving said controlling-devices into engagement with said fixed members, substantially as described.

70. In a weighing machine, a pivoted scale-beam, having two scale-beam bars, two automatically operated counterpoises arranged one on each bar, a locking-device for each counterpoise, for locking it at intermediate positions on the scale-beam bar, a controlling-device for each locking-device, borne by the scale-beam, fixed members on the frame with which said controlling-devices coöperate and with respect to which they are moved by the scale-beam, and means for lifting the scale-beam and for moving said controlling-devices into engagement with said fixed members, substantially as described.

71. In a weighing machine, a pivoted scale-beam, having two scale-beam bars, two automatically operated counterpoises arranged one on each bar, a locking-device for each counterpoise, adapted to engage and lock it at intermediate positions on the scale-beam bar, a movable detent lever for each locking-device adapted to govern its action, and detents fixed with respect to said detent levers into and out of engagement with which they are movable, substantially as described.

72. In a weighing machine, a pivoted scale-beam, having two scale-beam bars, two automatically operated counterpoises arranged one on each bar, a locking-device for each counterpoise, for locking it at intermediate positions on the scale-beam bar, a controlling-device for each locking-device, borne by the scale-beam, fixed members on the frame with which said controlling-devices coöperate and with respect to which they are moved by the scale-beam, and means for lifting the scale-beam and for moving said controlling-devices into engagement with said fixed members, and means for holding the scale-beam in elevated position while both counterpoises move along on the scale-beam bars, substantially as described.

73. In a weighing machine, a platform, a pivoted scale-beam, having two scale-beam bars, two automatically operated counterpoises arranged one on each bar, a locking-device for each counterpoise, for locking it at intermediate positions on the scale-beam bar, a controlling-device for each locking-device, borne by the scale-beam, fixed members on the frame with which said controlling-devices coöperate and with respect to which they are moved by the scale-beam, means, operated by depressing the platform, for lifting the scale-beam and for moving said controlling-devices into engagement with said fixed members, a prop for holding the scale-beam in elevated position while the counterpoises move along on the scale-beam bars, and means, also operated by depressing the platform, for moving said prop into position to engage the elevated scale-beam, substantially as described.

74. In a weighing machine, a platform, a pivoted scale-beam, having two scale-beam bars, two automatically operated counterpoises arranged one on each bar, a locking-device for each counterpoise, for locking it at intermediate positions on the scale-beam bar, a controlling-device for each locking-device, borne by the scale-beam, fixed members on the frame with which said controlling-devices coöperate and with respect to which they are moved by the scale-beam, means, operated by depressing the platform, for lifting the scale-beam and for moving said controlling-device into engagement with said fixed members, a prop for holding the scale-beam in elevated position while the counterpoises move along on the scale-beam bars and for moving said scale-beam with respect to the frame bearing said fixed members as the pressure of the scale-beam upon it is diminished, substantially as described.

75. In a weighing machine, a pivoted scale-beam, having two scale-beam bars, two automatically operated counterpoises arranged one on each bar, a locking-device for each counterpoise, for locking it at intermediate positions on the scale-beam bar, a controlling-device for each locking-device, borne by the scale-beam, fixed members on the frame with which said controlling-devices coöperate and with respect to which they are moved by the scale-beam, and means for simultaneously operating said locking-devices to release the counterpoises, substantially as described.

76. In a weighing machine, a platform, a pivoted scale-beam, having two scale-beam bars, two automatically operated counterpoises arranged one on each bar, a locking-device for each counterpoise, for locking it at intermediate positions on the scale-beam bar, a controlling-device for each locking-device, borne by the scale-beam, fixed members on the frame with which said controlling-devices coöperate and with respect to which they are moved by the scale-beam, means for moving the scale-beam with respect to said frame, and means, operated by elevating the platform, for simultaneously operating said locking-devices to release the counterpoises, substantially as described.

77. In a weighing machine, a pivoted scale-beam, having two scale-beam bars, two automatically operated counterpoises arranged one on each bar, means for locking said counterpoises at the outer ends of the scale-beam bars, means for successively releasing said counterpoises, permitting them to move along on the scale-beam bars to indicate the weight, means for locking said counterpoises at intermediate positions on the scale-beam bars, and means for thereafter releasing said counterpoises permitting them to return to their normal positions, substantially as described.

78. In a weighing machine, a pivoted scale-beam comprising two scale-beam bars, two automatically operated counterpoises arranged one on each bar, means for lifting the scale-beam to cause the counterpoises to move along on the scale-beam bars to indicate the weight, means for locking said counterpoises at the outer ends of the scale-beam bars, means for successively releasing said counterpoises, permitting them to move along on the scale-beam bars, means for locking said counterpoises at intermediate positions on the scale-beam bars, and means for thereafter releasing said counterpoises, permitting them to return to their normal positions, substantially as described.

79. In a weighing machine, a pivoted scale-beam, normally declining toward its outer end, comprising two parallel scale-beam bars, arranged one above the other and connected together, two counterpoises mounted respectively on said bars and normally occupying positions at the outer ends thereof, means for lifting the scale-beam to an elevated position to cause the counterpoises to move along on the scale-beam bars toward the inner ends thereof and means for locking said counterpoise at intermediate positions on the scale-beam bars, substantially as described.

80. In a weighing machine, a pivoted scale-beam, having two scale-beam bars, two automatically operated counterpoises arranged one on each bar, a locking-device for each counterpoise, adapted to engage the counterpoise at intermediate positions on the scale-beam bar, the operation of both locking-devices being controlled by the position of the scale-beam, means for lifting the scale-beam, means for holding it in elevated position and for further lifting it as the pressure upon it is reduced and for thereafter releasing it, substantially as described.

81. In a weighing machine, a pivoted scale-beam, having two scale-beam bars, two automatically operated counterpoises arranged one on each bar, means for locking said counterpoises at the outer ends of the scale-beam bars, means for releasing one of said counterpoises, and means for locking it at intermediate positions on the scale-beam bar while the other counterpoise remains at rest, and means for subsequently releasing said second counterpoise, and means for locking it at intermediate positions on the scale-beam bar, substantially as described.

82. In a weighing machine, a pivoted scale-beam having two scale-beam bars, two automatically operated counterpoises arranged one on each bar, means for locking said counterpoises at the outer ends of the scale-beam bars, means for releasing one of said counterpoises, means for locking it at intermediate positions on the scale-beam bar while the other counterpoise remains at rest, means for subsequently releasing said second counterpoise, means for locking it at intermediate positions on the scale-beam bar and means for thereafter simultaneously releasing both counterpoises, permitting them to return to their normal positions, substantially as described.

83. In a weighing machine, a pivoted scale-beam, normally declining toward its outer end, having two scale-beam bars, two automatically operated counterpoises arranged one on each bar, means for lifting said scale-beam and means for holding it in elevated position while the counterpoises move along on the scale-beam bars to indicate the weight, and locking devices for locking said counterpoises at intermediate positions on said bars, substantially as described.

84. In a weighing machine, a pivoted scale-beam, normally declining toward its outer end, having two scale-beam bars, two automatically operated counterpoises arranged one on each bar, means for lifting said scale-beam and means for holding it in elevated position while the counterpoises move along on the scale-beam bars to indicate the weight, a locking-device for each counterpoise for locking it at intermediate positions on its scale-beam bar, means for holding said locking-devices in unlocking position, which when operated release said locking-devices, permitting them to engage the counterpoises, and controlling means for said holding means, substantially as described.

85. In a weighing machine, a pivoted scale-beam, an automatically operated counterpoise thereon, a locking-device for locking the counterpoise at intermediate positions on the scale-beam, a controlling-device to govern the action of said locking-device, a pivoted frame-plate supporting said scale-beam and the locking-device and controlling-device, and means for adjusting said frame-plate on its pivot, substantially as described.

86. In a weighing machine, a pivoted scale-beam normally declining toward its outer end, an automatically operated counterpoise thereon, a platform, a rod connected with the scale-beam and with the platform, upward movement of which by depression of the platform acts to lift the scale-beam to cause the counterpoise to move along thereon to indicate the weight, and a rod also connected with the scale-beam and with the platform, downward movement of which by depression of the platform acts to further lift the scale-beam on its pivot, substantially as described.

87. In a weighing machine, a pivoted scale-beam normally declining toward its outer end, an automatically operated counterpoise thereon, a platform, pivoted balancing-levers supporting said platform, a rod connected with one of the balancing-levers for lifting the scale-beam on its pivot to cause the counterpoise to move along thereon to indicate the weight, and a rod connected with the other balancing-lever for further lifting the scale-beam on its pivot, substantially as described.

88. In a weighing machine, a pivoted scale-beam normally declining toward its outer end, an automatically operated counterpoise thereon, a platform, pivoted balancing-levers supporting said platform, means operated by a downward movement of said balancing-levers to lift the scale-beam on its pivot to allow the counterpoise to move along thereon to indicate the weight, and means also operated by the downward movement of said balancing-levers to further lift the scale-beam, substantially as described.

89. In a weighing machine, a pivoted scale-beam, an automatically operated counterpoise thereon, a locking-device adapted to engage the counterpoise at intermediate positions on the scale-beam, means operated by a movement of the scale-beam for controlling the operation of said locking-device and an actuating-device for the scale-beam, which supports it in elevated position and which lifts it when the pressure of the scale-beam thereupon is diminished, and which subsequently moves from beneath the scale-beam, permitting the scale-beam to balance, substantially as described.

90. In a weighing machine, a pivoted scale-beam, an automatically operated counterpoise thereon, a locking-device adapted to engage and lock the counterpoise at intermediate positions on the scale-beam, a movable detent-lever governing the action of said locking-device, a fixed detent controlling the operation of said detent-lever, and means for moving said detent-lever into position to coöperate with said fixed detent, substantially as described.

91. In a weighing machine, a pivoted scale-beam, normally declining toward its outer end, a counterpoise normally occupying a position at the outer end of said scale-beam which is adapted to move along thereon toward the inner end thereof to indicate the weight, means for locking the counterpoise at intermediate positions on the scale-beam, means for lifting the scale-beam to cause the counterpoise to move along thereon to indicate the weight having connected therewith means for subsequently operating the intermediate locking-device to release the counterpoise permitting it to return to its normal position, substantially as described.

92. In a weighing machine, a platform, a pivoted scale-beam, a counterpoise thereon, a locking-device adapted to engage the counterpoise at intermediate positions on the scale-beam, means, operated by the scale-beam, for controlling the operation of said locking-device, and means, operated by the rising platform, for operating said locking-device to release the counterpoise, substantially as described.

93. In a weighing machine, the combination of a pivoted scale-beam, an automatically operated counterpoise thereon, a locking-device adapted to engage the counterpoise at intermediate positions on the scale-beam, means, operated by the scale-beam, for controlling the operation of said locking-device, and adjustable means for moving the scale-beam to operate said locking-device and to vary the moment of its operation, substantially as described.

94. In a weighing machine, the combination of a pivoted scale-beam, an automatically operated counterpoise thereon, a locking-device for locking said counterpoise at intermediate positions on the scale-beam, means for holding said locking-device until it is released, means controlled by the position of the scale-beam for releasing said locking-device permitting it to engage the counterpoise, and means for subsequently operating said locking-device to release the counterpoise, substantially as described.

95. In a weighing machine, the combination of a pivoted scale-beam, two automatically operated counterpoises thereon, a locking device for each counterpoise adapted to lock the counterpoise at intermediate positions on the scale-beam, means, operated by the scale-beam, for successively controlling the operation of said locking-devices, and means for moving the scale-beam to thus successively operate said locking-devices, substantially as described.

96. In a weighing machine, the combination of a pivoted scale-beam having two scale-beam bars, two automatically operated counterpoises arranged one on each bar, a locking-device for each counterpoise adapted to lock the counterpoise at intermediate positions on the scale-beam bar, means for holding said locking-devices in their unlocking positions, means controlled by the scale-beam for successively releasing said locking-devices, and adjustable means for moving the scale-beam to release said locking-devices and to vary the moment of their release, substantially as described.

97. In a weighing machine, a pivoted scale-beam, two automatically operated counterpoises thereon, a locking-device for each counterpoise adapted to engage the counterpoise at intermediate positions on the scale-beam, means, operated by the scale-beam, for successively controlling the operation of said locking-devices, and an adjustable actuating-device for moving the scale-beam to successively operate said locking-devices, substantially as described.

98. In a weighing machine, the combination of a pivoted scale-beam, two automatically operated counterpoises thereon, a locking-device for each counterpoise adapted to engage the counterpoise at intermediate positions on the scale-beam, means for holding said locking-devices until they are released, means controlled by the position of the scale-beam for releasing said locking-devices permitting them to engage the counterpoises, and means for subsequently operating said locking-devices to release said counterpoises, substantially as described.

99. In a weighing machine, a pivoted scale-beam, two automatically operated counterpoises thereon, a locking-device for each counterpoise adapted to engage the counterpoise at intermediate positions on the scale-beam, the operation of both locking-devices being controlled by the scale-beam, means for releasing one of said locking-devices permitting it to operate and stop the counterpoise beyond the balancing point of the beam, and means for releasing the other locking-device permitting it to operate and stop the other counterpoise at the balancing point of the beam, substantially as described.

100. In a weighing machine, a pivoted scale-beam, two automatically operated counterpoises thereon, a locking-device for each counterpoise adapted to engage the counterpoise at intermediate positions on the scale-beam, the operation of both locking-devices being controlled by the scale-beam, means for holding said locking-devices until they are released, means for moving the scale-beam to release one of said locking-devices at or about the moment the beam balances, to stop one of the counterpoises beyond the balancing point of the beam, and for further moving the scale-beam to release the other locking-device to stop the other counterpoise at the balancing point of the beam, substantially as described.

In testimony whereof, I have signed my name to this specification, in the presence of two subscribing witnesses.

CLIFFORD J. McLEOD.

Witnesses:
B. J. NOYES,
H. B. DAVIS.